US005883346A

United States Patent [19]

Stöcken

[11] Patent Number: 5,883,346

[45] Date of Patent: Mar. 16, 1999

[54] MULTIFUNCTIONAL SWITCHING DEVICE FOR A MOTOR VEHICLE

[75] Inventor: Norbert Stöcken, Wetzlar/Blasbach, Germany

[73] Assignee: Mannesmann VDO AG, Frankfurt, Germany

[21] Appl. No.: 819,230

[22] Filed: Mar. 17, 1997

[30] Foreign Application Priority Data

Mar. 18, 1996 [DE] Germany .......................... 196 10 344.4

[51] Int. Cl.[6] .............................. H01H 3/00; H01H 9/00; H01H 25/00; B60R 16/02

[52] U.S. Cl. .................................. 200/4; 200/5 R; 200/18

[58] Field of Search .................................. 200/45 R, 5 A, 200/6 A, 17 R, 18, 61.27, 61.54, 11 R; 235/145 R; 74/471 XY; 345/156

[56] References Cited

U.S. PATENT DOCUMENTS

| | | | |
|---|---|---|---|
| 2,841,659 | 7/1958 | Eitel | 200/5 R |
| 3,238,316 | 3/1966 | Voss | 200/6 A |
| 3,293,381 | 12/1966 | Eitel | 200/6 A |
| 3,319,884 | 5/1967 | Franklin | 235/145 R |
| 4,273,971 | 6/1981 | Tregurtha | 200/4 |
| 4,315,117 | 2/1982 | Kokubu et al. | 200/61.27 |
| 4,492,128 | 1/1985 | Heidelberger et al. | 74/471 XY |
| 4,866,221 | 9/1989 | Obermann et al. | 200/5 R |
| 5,281,779 | 1/1994 | Bogovican et al. | 200/5 R |
| 5,430,265 | 7/1995 | Beattie et al. | 200/61.54 |
| 5,510,810 | 4/1996 | Nishijima et al. | 245/156 |
| 5,589,828 | 12/1996 | Armstrong | 200/6 A X |
| 5,610,378 | 3/1997 | Durocher et al. | 200/61.54 |
| 5,705,778 | 1/1998 | Matsui et al. | 200/11 R |

FOREIGN PATENT DOCUMENTS

0366132b1 10/1989 European Pat. Off. .

*Primary Examiner*—J. R. Scott

*Attorney, Agent, or Firm*—David M. Thimmig; Mayer Brown & Platt

[57] ABSTRACT

A multifunctional control device for an electronic apparatus having a control element that has a shaft that passes through a front panel and a slide element. The control element is biased to a centered position with respect to the opening in which it passes through the front panel. A plurality of electrical contact elements are arranged behind the front panel and are spaced from the slide element when the control element is in the centered position. The control element is adapted to permit transverse movement of the control element with respect to the front panel. The transverse movement of the control element is transmitted to the slide element to move the slide element within a plane parallel to the front panel and to engage at least one electrical contact element.

20 Claims, 4 Drawing Sheets

MULTIFUNCTIONAL SWITCHING DEVICE FOR A MOTOR VEHICLE

BACKGROUND OF THE INVENTION

1. Field of the Invention

The invention relates to a multifunctional control device for a vehicle, for example for a motor vehicle, for selecting groups of functions (menus) and/or single functions by means of an axially and rotationally operable control element, an activation of an enter function taking place through operation of said control element.

2. Description of Related Art

Such a control device is known, for example, from EP 0 366 132 B1. In this known control device, a single bidirectional rotary switch is used for the selection of menus and of individual functions, the rotary switch having rest positions to which menus or single functions are assigned, while the enter function can be triggered by an axial movement of the rotary switch. In an embodiment of this known device, the number of rest positions correspond to the number of menus and/or functions. Furthermore, individual messages on a display screen are assigned to the menus and/or functions in the known construction, such that the messages corresponding to each menu or single function associated with the rest positions of the rotary switch are optically highlighted. It is furthermore possible to display optically the messages for the menus or single functions corresponding to the rest positions of the rotary switch after triggering of the enter function.

SUMMARY OF THE INVENTION

The invention has for its object to increase the application possibilities of the multifunctional control device mentioned in the opening paragraph.

According to the invention, this object is achieved in that the control element is arranged with transverse sliding possibility within at least one plane comprising the axis of the control element and cooperates with contact elements, and menus and/or functions are assigned to the contact positions of the control element upon a transverse movement thereof within said plane.

This construction has the advantage that the rotary movement of the control element can now be used for other purposes since the selection of the menus and/or functions is achieved through a transverse operation of the control element. When the invention is applied to a car radio, for example, the volume control of the radio which is present anyway can now also be used for the above operations, i.e. the selection of the menus and/or functions. This means that a rotary switch and further operational elements can be dispensed with compared with the known construction since now all operations can be carried out with a single control element. This results in an easier selection of menus or functions and thus a reduced distraction of the attention from the traffic in the case of use in a car radio. The contact elements may be, for example, limit switches, slide switches, or the like.

In an embodiment of the invention, the control element is in addition constructed so as to be depressable, the enter function being triggered by an axial movement of the control element or by a depression of the control element. Such a construction further increases the application possibilities. If the enter function is effected by an axial movement, for example, the depression may serve to perform any other function as desired, or vice versa. Switches or sensors may, for example, be present in the control element so as to be operated by the depression operation.

In an embodiment of the invention, the number of planes, and thus the contact elements arranged in said planes, corresponds to the number of menus and/or functions to be selected. Such an arrangement means, for example when there is a single plane present, that e.g. two limit switches are provided, one at each end of the operational path. This renders it possible, for example, to select two menus and/or functions.

A function may also be selected, for example, through moving of a cursor or index bar on an optical display unit.

The number of planes may be increased so as to suit the number of menus and/or functions to be selected. In an embodiment of the invention with more than one plane, accordingly, individual planes are arranged so as to be distributed circumferentially.

A preferred embodiment of the invention is characterized by two operational planes for the transversely movable control element arranged at right angles to one another, contact elements being arranged so as to correspond to end positions of the control element. This construction renders possible a simple operation, one in horizontal and another in vertical direction.

An exact operation of the control element is rendered possible in that each of the planes provided has associated guide elements for the control element. A so-called “blind” operation by a driver of a motor car is also rendered possible thereby, after a suitable training.

An advantageous embodiment of the invention is characterized in that the control element is the volume knob of a radio, and the volume can be adjusted through rotation of the control element. This provides the possibility of carrying out all desired functions by means of a single control element which is operable in axial direction, rotatable, transversely movable, and depressable. This means that no further control element for selecting and activating the menus and/or functions mentioned above is necessary anymore besides the volume control which is present anyway in a car radio.

In a further embodiment of the invention, the selected and activated menus and/or functions can be displayed, for example, on a display screen. It is in addition possible to generate an acoustic signal when the desired menus and/or functions have been selected and/or activated through triggering of the enter function.

In a further embodiment of the invention, the control element is connected to a slide element arranged with transverse sliding possibility on a front plate and capable of being brought into operational contact with contact elements arranged below the front plate via bridges. This construction renders possible a simple and reliable operation, and thus a reliable selection and activation of the menus and/or functions.

In a further embodiment of the invention, the control element comprises a rotary knob which can be fixedly connected to the slide element and which is connected via an elastic component to a fixed rotary shaft of the control element such that said rotary shaft of the control element can be freely operated in the case of a transverse movement of the rotary knob. A control element constructed in this way thus renders possible a transverse movement as well as a rotary movement and an axial movement, without these various movement possibilities interfering with one another.

In a further embodiment of the invention, the control element is constructed as a joystick which is movably supported at one end, and a slide element arranged with movement possibility parallel to the front plate and cooperating with contact elements arranged in the end positions can be operated by a pivoting movement of the control element within at least one plane.

In a further embodiment of the invention, switches or sensors are provided inside the rotary knob which detect a movement caused by depressing or compressing, which movement is generated by two mutually opposed forces acting in at least one plane. A space-saving, compact construction results therefrom.

BRIEF DESCRIPTION OF THE DRAWINGS

In the drawing, FIGS. 1 to 6 diagrammatically show embodiments of the subject of the invention.

FIGS. l*a* and 1*b* are a diagrammatic side elevation and a plan view of a control element according,.to the invention.

DESCRIPTION OF THE PREFERRED EMBODIMENTS

Figure 1A:
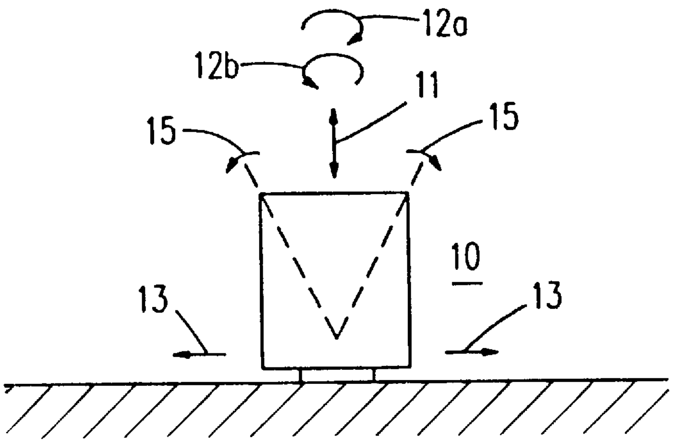
Figure 1B:
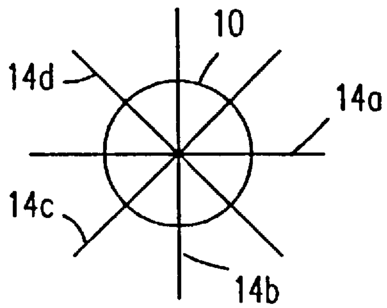

FIG. 1*a* is a diagrammatic side elevation of a control element 10 which is vertically movable in axial direction 11 and rotatable to the left and right in circumferential directions 12*a* and 12*b*. In addition, the control element 10 is transversely movable in direction 13, parallel to a front plate. This transverse movement in direction 13 can take place in various planes 14 which are perpendicular to the front plate and which each contain the axis of the control element 10, as is evident from FIG. 1*b*. FIG. 1*b* shows, for example, a first plane 14*a*, a second plane 14*b* perpendicular thereto, and two further, mutually perpendicular planes 14*c* and 14*d*.

Instead of the horizontal transverse shifting possibility in direction 13, a transverse movement may also result from the fact that the control element 10 is pivotable in direction 15. This will be explained in more detail with reference to the embodiments described below.

Figure 2:
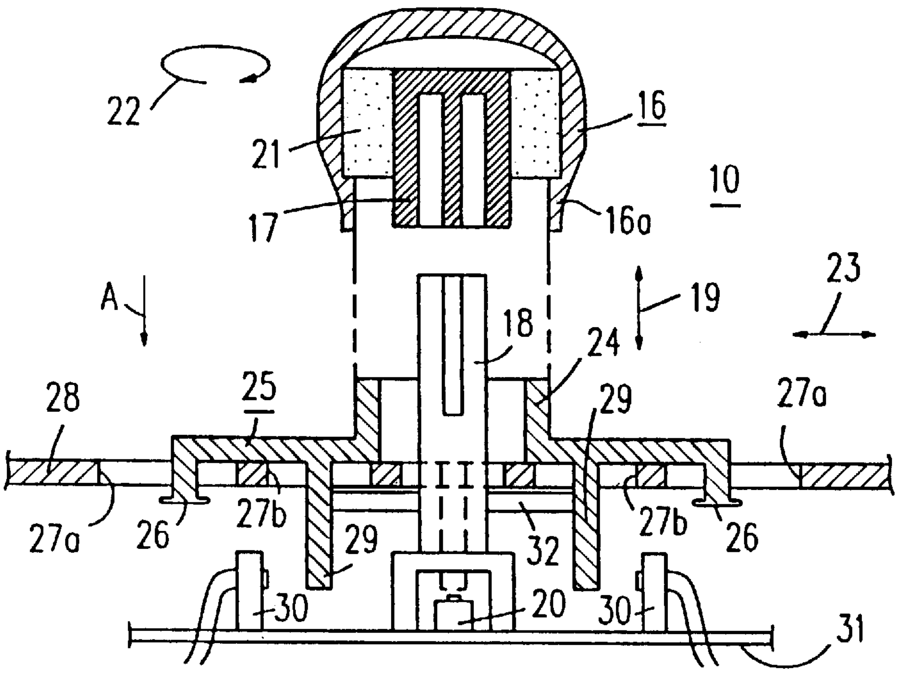
FIG. 2 is a cross-section of a control element comprising a rotary knob incorporated in a front plate, on an enlarged scale.

The control element 10 of FIG. 2 comprises a rotary knob 16 with a centrally arranged operating element 17 for a usual rotary shaft 18. The rotary shaft 18 is in addition so supported that it can move in axial direction 19, while it can operate a contact switch 20 arranged at the end in the case of vertical operation. Rotation of the shaft 18 may serve to control, for example, the volume of a radio. The centrally arranged operating element 17 cooperating with the shaft 18 is journalled in an easily compressable synthetic-resin part 21 which has no elasticity for torsional forces. This means that the rotary knob 16 when rotated in direction 22 will carry along the operating element 17, but that the resin part 21 will be compressed when the rotary knob 16 is operated in transverse direction 23, so that in this transverse movement the rotary knob 16 is movable in direction 23, whereas the operating element 17 arranged on the shaft 18 remains in position.

An annular flange 16*a* engages a ring 24 of a slide element 25 which is preferably made from synthetic resin and which is supported with sliding possibility in transverse direction 23 by means of projections 26 in slots 27*a* of a front plate 28. The slide element 25 further comprises bridges 29 which project through further slots 27*b* and which cooperate with contact elements upon a transverse operation of the slide element, 25 by movement of rotary knob 16 in transverse direction 23 which contact elements are constructed, for example, as contact switches 30 and are arranged on a board 31 below the front plate 28. 32 denotes an annular spring which ensures that the rotary knob 16 returns to its rest position after the end of each transverse operational movement.

Figure 3:
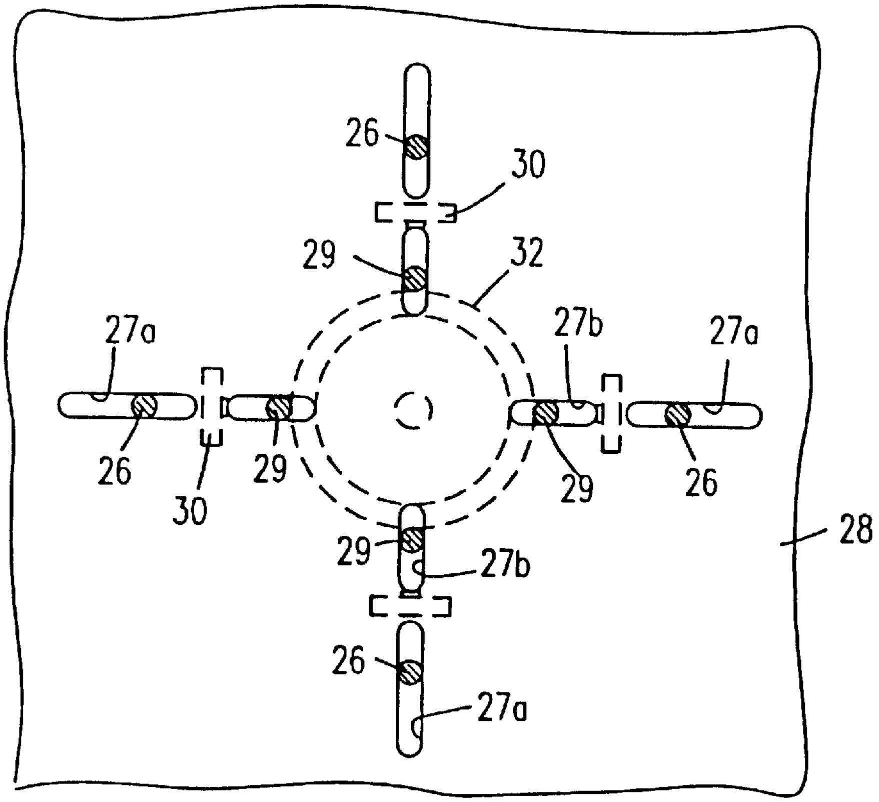
FIG. 3 is an elevation seen from direction A in FIG. 2, without the control element being mounted.
Figure 4:
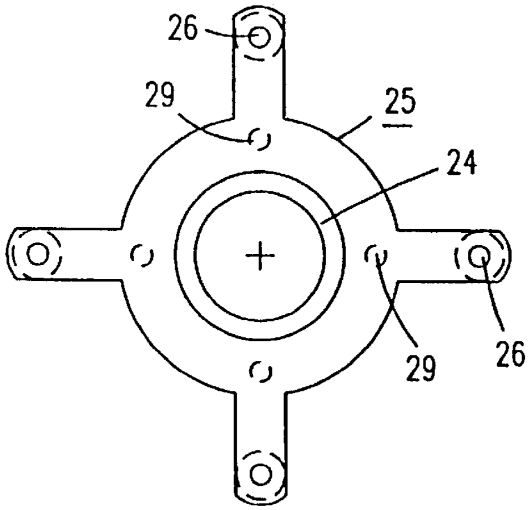
FIG. 4 is a plan view a slide element also visible in FIG. 2 and cooperating with the control element

In FIGS. 3 and 4, the slide element 25 is guided in the slots 27*a* of the front plate 28 by means of its projections 26. FIG. 3 only shows the projections 26 and bridges 29 of the slide element 25 in a cross-section taken just above the top surface of the front plate 28.

Figure 5A:
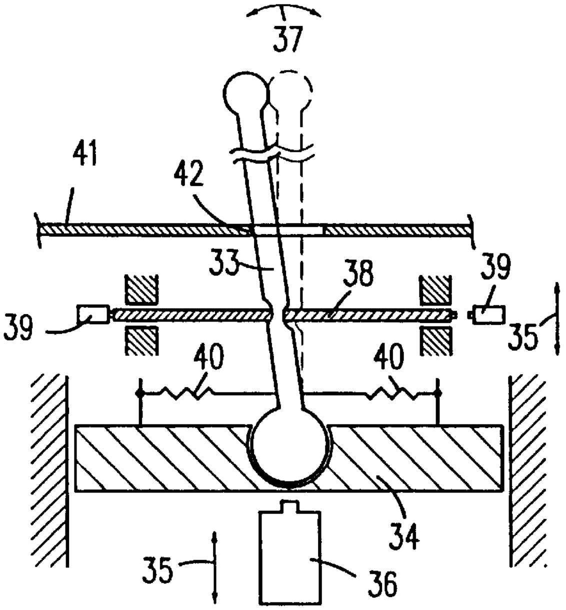
FIGS. 5*a* to 5*d* are four partial views of a further embodiment of the control element according to the invention.
Figure 5B:
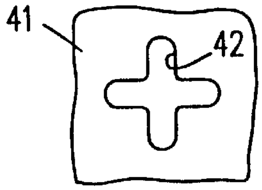

FIG. 5*a* is a diagrammatic partial cross-section of a control element 33 which is supported in joystick fashion at one end in a plate 34 by means of a ball joint, while this plate in its turn is movable in a vertical direction 35 so as to operate a contact 36. A pivoting movement of the control element in direction 37 can move a slide element 38 transversely to the vertical direction 35, which slide element in its end positions cooperates with contact elements constructed as contact switches 39 in these locations. Resetting of the control element 33 into its vertical rest position is effected by springs 40. A mechanical guiding of the control element 33 in the front plate 41 is effected by corresponding slots 42. In the cross-shaped slot arrangement 42 of FIG. 5*b*, accordingly, a transverse movement in two planes enclosing an angle of 90° is possible.

Figure 5C:
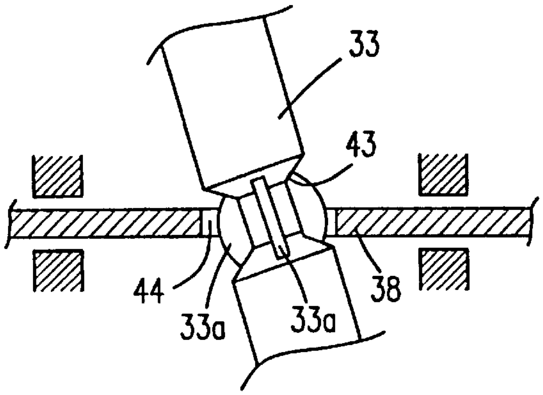

FIG. 5*c* is an elevation on an enlarged scale of the manner in which the slide element 38 is taken along by the control element 33, the control element 33 being provided with wedge-shaped depressions 43 which in conjunction with catch is 33*a* cooperate with mating holes 44 of the slide element 38.

Figure 5D:
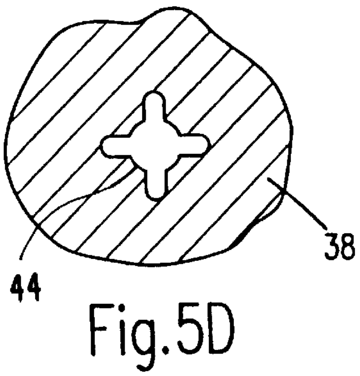

FIG. 5*d* shows the holes 44 in an enlarged elevation. The slide element 38 is so constructed that it acts as an incremental optical transducer which is known per se and is accordingly not shown in any detail here. The function of the incremental optical transducer is safeguarded in each and every position of the slide element 38.

Figure 6:
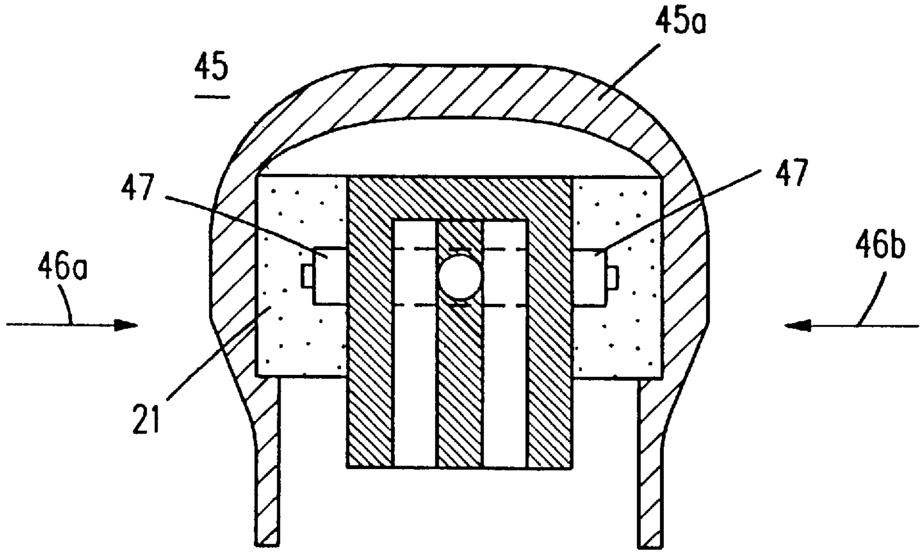
FIG. 6 shows a further embodiment of the rotary knob.

FIG. 6 shows another embodiment of the rotary knob 45, which is compressable here. When this rotary knob 45 is pressed together from two mutually opposed directions 46*a*, 46*b* lying in one plane, this will lead to the operation of switches or sensors 47 arranged in the interior. In contrast to the construction of FIG. 2, therefore, the outer shell 45*a* of the control knob is not rigid here but compressable.

I claim:

1. A multifunctional control device for an electronic apparatus comprising:

a front panel having a front face and a rear face and at least one opening therethrough;

a slide element mounted for movement parallel to said front face of said front panel, said slide element having at least one opening therethrough;

a control element having a shaft passing through said opening in said front panel and said opening in said slide element;

a biasing element to bias said control element to a position centered about said opening in said front panel;

a plurality of electrical contact elements located behind said rear face of said front panel, said contact elements spaced from said slide element when said control element is in said position centered about said opening in said front panel whereby said control element is adapted to be moved transversely to said front face of said front panel and to transmit such movement to said slide element to move said slide element within a plane parallel to said front face of said front panel to permit said slide element to engage at least one electrical contact element.

2. A multifunctional control device for an electronic apparatus in accordance with claim 1 wherein said control element is adapted to be moved toward said front face of said front panel to a depressed position and at least one electrical contact element is adapted to be engaged when said control element is in said depressed position.

3. A multifunctional control device for an electronic apparatus in accordance with claim 1 wherein said control element further comprises a rotatable shaft mounted for rotation about an axis perpendicular to said front face of said front panel.

4. A multifunctional control device for an electronic apparatus in accordance with claim 1 wherein said control element further comprises a pivotally mounted shaft having a centered position along an axis perpendicular to said front face of said front panel and centered with respect to said opening in said front panel.

5. A multifunctional control device for an electronic apparatus comprising:

a front panel having a front face and a rear face, said panel having an opening and slots therethrough;

a slide element having a central opening therethrough and having bridges extending through said front panel slots permitting limited movement of said slide element parallel to said front face of said front panel;

a control element having a rotatable shaft passing through said opening in said front panel and through said central opening in said slide element, said shaft being mounted for rotation about an axis;

said control element further comprising a knob resiliently mounted on said shaft and adapted to engage said slide element;

a plurality of electrical contact elements located behind said rear face of said front panel, said contact elements spaced from said slide element when said control element is centered about said shaft whereby transverse movement of said knob is transmitted to said slide element to move said slide element transversely with respect to said front face of said front panel to a first position to engage at least one bridge with at least one electrical contact element.

6. A multifunctional control device for an electronic apparatus in accordance with claim 5 wherein said device further comprises a biasing element to bias said slide element to a position centered about said axis.

7. A multifunctional control device for an electronic apparatus in accordance with claim 5 wherein said front panel slots are located along at least one axis in a plane perperidicular to the axis of said shaft.

8. A multifunctional control device for an electronic apparatus in accordance with claim 5 wherein said front panel slots are located along a plurality of intersecting axes with all of the axes in a plane perpendicular to the axis of said shaft.

9. A multifunctional control device for an electronic apparatus in accordance with claim 5 herein said knob of said control element is constructed to be moved transversely with respect to said front face of said front panel to move said slide element to a second position to engage at least a second bridge with at least a second electrical contact element.

10. A multifunctional control device for an electronic apparatus in accordance with claim 5 wherein said knob further comprises a non-rigid outer shell and at least one electrical contact element constructed to be engaged by compression of said outer shell by mutually opposed forces acting on said outer shell.

11. A multifunctional control device for an electronic apparatus in accordance with claim 5 wherein said knob further comprises a resilient mounting member adapted to provide rotational input from said knob to said rotary shaft while permitting transverse movement of said knob relative to said rotary shaft.

12. A multifunctional control device for an electronic apparatus in accordance with claim 11 wherein said knob may be rotated to rotate said shaft during transverse movement of said knob and said slide element.

13. A multifunctional control device for an electronic apparatus in accordance with claim 5 wherein said control element is mounted for axial movement along the axis of rotation of said shaft and at least one electrical contact element is adapted to be engaged by said shaft when the knob of said control element is moved toward said front panel to a depressed position.

14. A multifunctional control device for an electronic apparatus in accordance with claim 5 Wherein said control element has a volume control function whereby the volume is adjusted by rotation of the control element.

15. A multifunctional control device for an electronic apparatus in accordance with claim 5 wherein said electrical contact elements are switches.

16. A multifunctional control device for an electronic apparatus in accordance with claim 5 wherein said electrical contact elements are sensors.

17. A multifunctional control device for an electronic apparatus comprising:

a front panel having a front face and a rear face, said panel having a slotted opening therethrough;

a slide element having a central opening therethrough with slots extending radially from said opening;

a control element pivotally mounted at one end and having a shaft passing through said opening in said slide element and through said slotted opening in said front panel;

said control element further having projections along said shaft, said projections adapted to cooperate with said slots extending radially from said central opening in said slide element;

a plurality of electrical contact elements located behind said rear face of said front panel, said contact elements spaced from said slide element when said shaft is perpendicular to said front face of said front panel whereby pivoting movement of said control element within said slotted opening in said front panel is transmitted to said slide element to move said slide element within a plane parallel to said front face of said front panel to permit said slide element to engage at least one electrical contact element.

18. A multifunctional control device for an electronic apparatus in accordance with claim 17 further comprising a biasing element to bias said control element shaft to a position perpendicular to said front face.

19. A multifunctional control device for an electronic apparatus in accordance with claim 17 wherein said pivotally mounted control element is adapted to be moved toward said front face of said front panel to a depressed position and at least one electrical contact element is adapted to be engaged when said control element is in said depressed position.

20. A multifunctional control device for an electronic apparatus in accordance with claim 17 wherein said control element further comprises a knob having a non-rigid outer shell and at least one electrical contact constructed to be engaged by compression of said outer shell by mutually opposed forces acting on said outer shell.

* * * * *